United States Patent [19]
Blackwell

[11] Patent Number: 5,527,070
[45] Date of Patent: Jun. 18, 1996

[54] DAMAGE PROTECTION FOR IN-GROUND PIPE FOUNDED IN EXPANSIVE SOILS

[76] Inventor: William C. Blackwell, 1124 Lexan Ave., Norfolk, Va. 23508-1237

[21] Appl. No.: 417,233

[22] Filed: Apr. 5, 1995

[51] Int. Cl.⁶ .................................................... F16L 11/12
[52] U.S. Cl. .................... 285/45; 285/55; 285/236; 138/146; 138/151; 138/105; 405/157
[58] Field of Search .................. 405/157; 285/293, 285/235, 236, 237, 45, 55; 138/105, 110, 145, 146, 151

[56] References Cited

U.S. PATENT DOCUMENTS

| | | | |
|---|---|---|---|
| 2,708,123 | 5/1955 | Risley et al. | 285/45 |
| 3,321,357 | 5/1967 | Kennedy | 138/146 X |
| 3,633,946 | 1/1972 | Kazmierski | 285/229 |
| 3,699,690 | 10/1972 | Watter | 405/157 |
| 3,850,670 | 11/1974 | Gregory et al. | 138/146 X |
| 4,443,282 | 4/1984 | Stachitas | 285/235 X |
| 4,583,770 | 4/1986 | Kreku et al. | 285/293 X |
| 4,778,700 | 10/1988 | Pereira | 138/151 X |
| 4,930,543 | 6/1990 | Zuiches | 285/45 X |
| 5,096,206 | 3/1992 | Andre | 285/236 X |
| 5,099,889 | 3/1992 | Ratzlaff | 405/157 X |
| 5,104,701 | 4/1992 | Cohen et al. | 138/151 X |

Primary Examiner—Dave W. Arola

[57] ABSTRACT

An in-ground installed pipe system, laid in expansive type soils, that has a plastic-like wrapping of the main pipe area and a plastic-like covered cushion layer of the joint connections, to provide protection to a pipe system against pipe movement and joint connection disruption, during the swelling and shrinkage process of the surrounding expansive soil, during seasonal variations of moisture content of the soil. The plastic-like wrapping of the pipe section is usually installed prior to installing the pipe into the trench. The plastic-like covered cushion layer is installed around the pipe joint connection, in the trench, after the pipe is installed into the end of the previously laid pipe section. The plastic-like wrapped main pipe section provides a longitudinal slip plane between the moving surrounding soil and the pipe, and the plastic-like covered cushion layer provides clearance for movement of the surrounding soil adjacent to the pipe joint connection, so that the moving soil will not disrupt the pipe joint connection. The obvious benefit of this system of installation is to prevent pipe breakage and/or pipe joint connection separation, which would allow surrounding liquid or gas enter the pipe, or allow liquid or gas from within the pipe to be lost into the surrounding soil.

1 Claim, 1 Drawing Sheet

DAMAGE PROTECTION FOR IN-GROUND PIPE FOUNDED IN EXPANSIVE SOILS

BACKGROUND OF THE INVENTION

1. Field of the Invention

In ground pipe systems founded in expansive soils.

2. Prior Art

In-ground pipe systems founded in expansive soils are subject to pressures caused by the movement of the surrounding soil, due to the swelling and shrinking of the soil, which is caused by the variation of the moisture content of the surrounding soil during the changing ground water conditions. One of the characteristics of expansive type soils such as clays, is that they expand upon increase in moisture content and shrink upon decrease in moisture content. The pressure exerted upon the pipe and the pipe joint connections causes breakage of the pipe and/or disruptive effects upon the pipe joint connections, such as opening up of the joints. The pressure placed upon bends in the pipe horizontal or vertical direction, and pressures placed upon the projection flanges at the pipe joint connections, are especially critical. Once the pipe is broken or disconnected at any location, the inflow of surrounding liquid and gas into the pipe and/or the outflow of liquid or gas into the surrounding soil, is of great concern. The loss of water from a water supply system, or the infiltration of liquid into the piping system leading to a sewage treatment plant is to only name a few, cases of concern.

SUMMARY OF THE INVENTION

It is the object of this invention to provide for the in-ground installation of a pipe system carrying liquid or gas to be less subject to the destructive effect caused by the swelling and shrinkage pressures from the surrounding soil during the variable ground water conditions.

It is another object of this invention to provide the main pipe section with a plastic-like wrapping to allow for a slip plane between the surrounding swelling/shrinking soil and the outer surface of the main pipe section.

It is a further object of this invention to provide the pipe joint connection with a plastic-like covered cushion wrapping to allow for a slip plane and a cushioned clearance between the surrounding swelling/shrinking soil and the pipe joint connection area.

DESCRIPTION OF THE PREFERRED EMBODIMENTS

Figure 1:
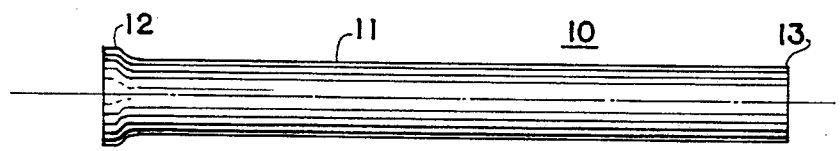
FIG. 1 is an elevation view of a typical pipe that has a flanged (bell shape) at the one end, and a plain opposite end.
Figure 2:
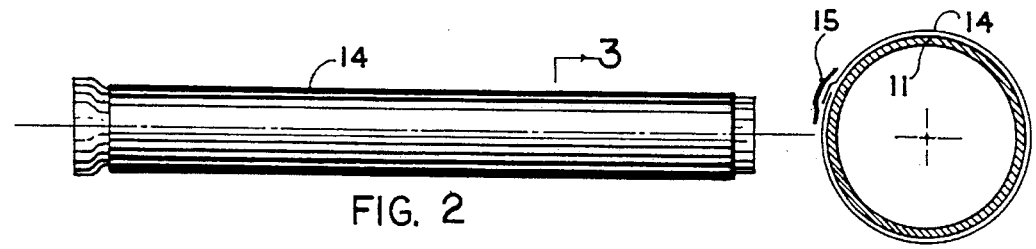
FIG. 2 is an elevation view of this pipe, showing the plastic-like wrapping installed on the main pipe section.

Referring to the drawing and particularly to FIG. 1, there is shown a typical pipe length 10. The main pipe section 11, the pipe bell end 12, and the pipe plain end 13 are indicated. The pipe material is typically cast iron, steel, concrete, or plastic, to name a few Referring to FIG. 2, the main pipe section 11, shown in FIG. 1, is covered with the plastic-like outer wrap 14. This plastic wrapping is usually installed prior to placing the pipe into the trench.

Figure 3:
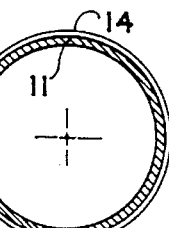
FIG. 3 is a cross section taken within the wrapped main pipe section showing the overlapping of the plastic-like wrapping, with the overlap taped longitudinally to secure it in position.

Referring to FIG. 3, which is a cross section taken within the main pipe section 11, there is shown the main pipe section 11, the plastic-like outer wrap 14, along with the main pipe wrapping overlap longitudinal tape 15, used to secure the wrapping in place. Tape is shown, but other methods of securing the overlap can be used.

Figure 4:
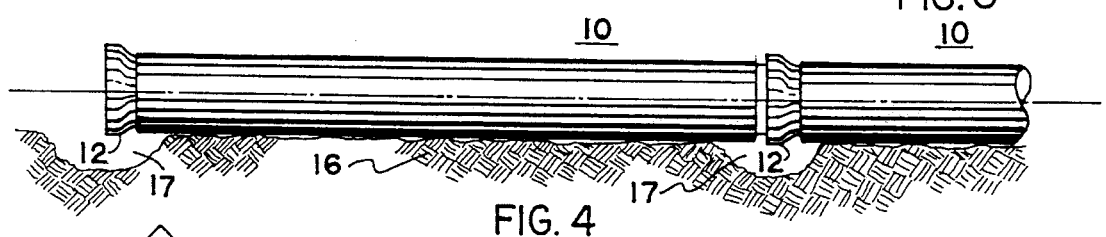
FIG. 4 shows this pipe section installed into the bell end of a previously installed pipe section, located in its final trench position. A dug out is shown, which is to provide working clearance at the pipe joint connection area.

Referring to FIG. 4, the new pipe length 10, is shown in the trench, bearing upon the trench bottom soil 16, and inserted into a previously installed pipe length 10. The soil area 17, under the pipe connection is shown excavated, which provides working space for the pipe bell end 12.

Figure 5:
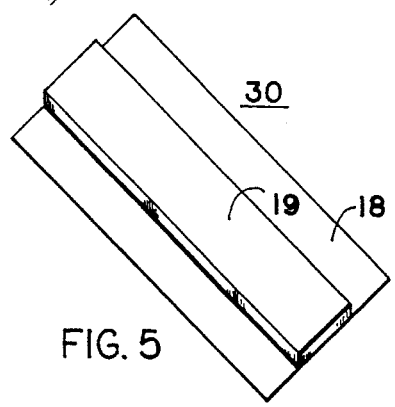
FIG. 5 shows a perspective view of a typical plastic-like cushion wrap that is to be installed at the pipe joint connection.

Referring to FIG. 5, there is shown the plastic-like covered cushion layer wrapping 30. This plastic-like covered cushion layer wrapping 30 consists of the outer plastic-like wrap 18, which may be of similar material as the plastic-like outer wrap 14, shown in FIG. 2. The cushion material 19 is shown adjacent to the outer plastic-like wrap 18. This cushion material 19 has thickness as required by the degree of sensitivity of the surrounding expansive soil and enough hardness to resist the initial soil back fill pressure around the joint connection area. The two materials may or may not be bonded together, as required for installation convenience.

Figure 6:
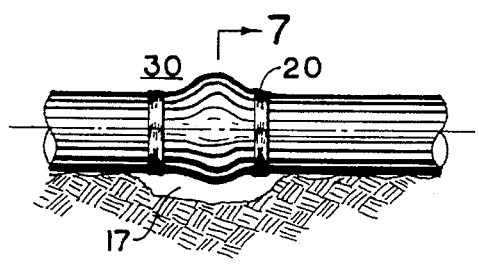
FIG. 6 is an elevation of the pipe joint connection area that has the plastic-like cushion wrap installed, showing the circumference taped to secure the wrap onto the main pipe section pipe wrapping.

Referring to FIG. 6, the pipe joint connection area is shown with the plastic-like covered cushion layer wrapping 30 installed, along with circumference tape 20 applied around the circumference edges. Also shown is the excavation soil area under 17, the pipe connection.

Figure 7:
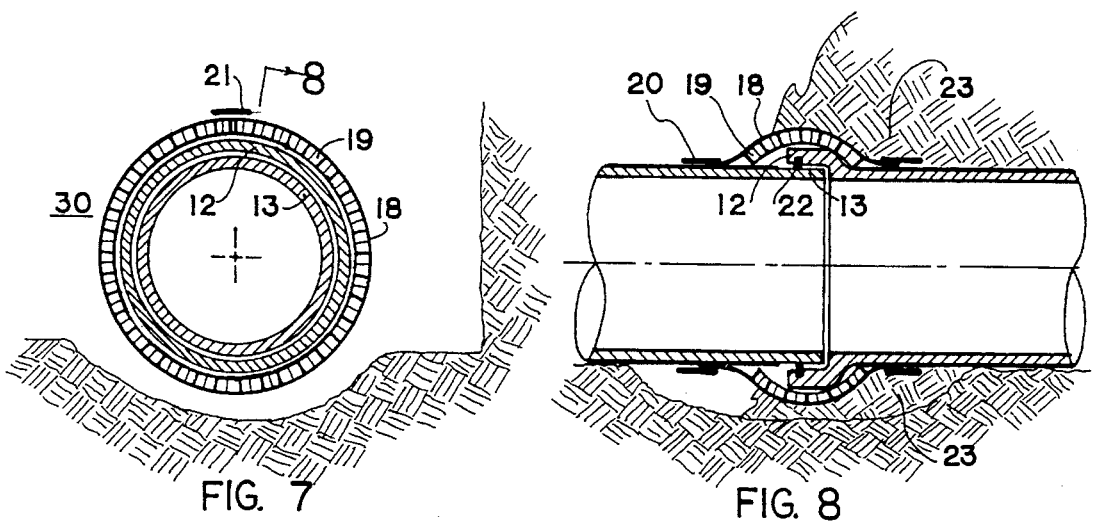
FIG. 7 is a cross section taken through this joint connection, indicating the different pipe materials, including the outer plastic-like cushion wrap and the longitudinal overlap tape.

Referring to FIG. 7, which is a cross section taken through FIG. 6, there is shown the pipe plain end 13, the pipe bell end 12, cushion material 19, the outer plastic-like wrap 18, and the longitudinal tape 21 for the plastic-like covered cushion layer wrapping 30.

Figure 8:
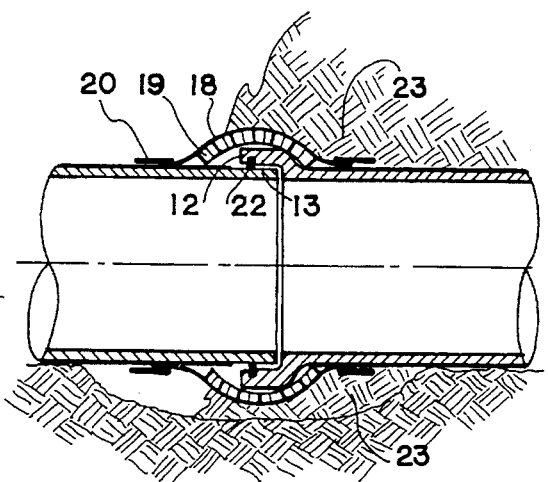
FIG. 8 is a longitudinal section taken at the pipe joint connection showing the completed wrapped and taped joint, along with the pipe materials indicated.

Referring to FIG. 8, a longitudinal section is taken to show the pipe plain end 13, the pipe bell end 12, the typical pipe joint seal 22, which is usually of a rubber type material, along with the cushion material 19, the outer plastic-like wrap 18, and the circumference tape 20. On the right side of this FIG. 8, is shown the partially back-filled soil material 23, which may be of expansive soil type or non-expansive soil type.

I claim:

1. An in-ground pipeline comprising:

at least two pipe members, each terminating in a first and second end, said first end of one said pipe member positioned in said second end of the other said pipe member forming a joint there-between and sealing means in said joint for sealing said joint;

a plastic-like wrapping covering substantially the entire length of each said pipe member, means for retaining the plastic-like wrapping on each said pipe member;

a plastic-like covered cushion wrapping over said joint and also overlapping said plastic-like wrapping on the two joined pipe members and means for retaining said plastic-like covered cushion wrapping over said joint and said plastic-like wrapping; said plastic-like covered cushion wrapping comprising an outer plastic-like layer and an inner layer of cushion material, said inner layer being of less axial extent than said outer layer so that said outer layer engages each said plastic-like wrapping covering said pipe member;

said plastic-like wrapping providing a slip plane between surrounding soil and said pipe members and said plastic-like covered cushion wrapping providing a slip plane between surrounding soil and said joint thereby preventing damage to the pipes and joints caused by longitudinal forces on the pipes created from swelling and shrinkage pressures of surrounding expansive soil.

* * * * *